(12) United States Patent
Waita

(10) Patent No.: US 7,617,161 B2
(45) Date of Patent: Nov. 10, 2009

(54) VEHICLE APPRAISAL ASSISTING ROBOT AND VEHICLE APPRAISAL SYSTEM USING THE ROBOT

(75) Inventor: Hironori Waita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 482 days.

(21) Appl. No.: 11/107,827

(22) Filed: Apr. 18, 2005

(65) Prior Publication Data

US 2005/0267633 A1 Dec. 1, 2005

(30) Foreign Application Priority Data

May 13, 2004 (JP) ............................. 2004-143138

(51) Int. Cl.
G06Q 99/00 (2006.01)
G06F 17/30 (2006.01)
G06F 19/00 (2006.01)

(52) U.S. Cl. .......................... 705/500; 705/27; 700/245

(58) Field of Classification Search .................. 705/27, 705/500; 901/47; 700/245
See application file for complete search history.

(56) References Cited

U.S. PATENT DOCUMENTS

| | | | | |
|---|---|---|---|---|
| 4,855,770 A * | 8/1989 | Mauchan et al. | ............. | 396/544 |
| 5,504,674 A * | 4/1996 | Chen et al. | ....................... | 705/4 |
| 5,555,266 A * | 9/1996 | Buchholz et al. | ............. | 370/347 |
| 5,696,673 A * | 12/1997 | Pryor | ........................... | 700/66 |
| 5,950,169 A * | 9/1999 | Borghesi et al. | ................ | 705/4 |
| 5,978,776 A * | 11/1999 | Seretti et al. | .................... | 705/26 |
| 6,182,048 B1 * | 1/2001 | Osborn et al. | ................... | 705/4 |
| 6,611,734 B2 * | 8/2003 | Parker et al. | ................. | 700/258 |
| 7,020,584 B2 * | 3/2006 | Takaoka et al. | .............. | 702/188 |
| 2002/0128985 A1 * | 9/2002 | Greenwald | ................... | 705/400 |
| 2003/0050843 A1 * | 3/2003 | Onoue | ........................... | 705/20 |
| 2003/0200151 A1 * | 10/2003 | Ellenson et al. | ................ | 705/26 |
| 2004/0010344 A1 * | 1/2004 | Hiratsuka et al. | ............ | 700/245 |
| 2004/0088373 A1 * | 5/2004 | Karukka et al. | .............. | 709/217 |
| 2004/0243423 A1 * | 12/2004 | Rix et al. | ......................... | 705/1 |
| 2005/0004475 A1 * | 1/2005 | Giron | ........................... | 600/476 |

FOREIGN PATENT DOCUMENTS

| JP | 11-184910 | | 7/1999 |
|---|---|---|---|
| JP | 200114395 A | * | 1/2001 |
| JP | 2003157371 A | * | 5/2003 |
| JP | 2003254734 A | * | 9/2003 |

OTHER PUBLICATIONS

Murphy, H.L., "Big Contracts Fuel Car-Repair Data Firm," Crain's Chicago Business, vol. 20, No. 18, p. 20, May 5, 1997.*

(Continued)

*Primary Examiner*—Nicholas D Rosen
(74) *Attorney, Agent, or Firm*—Squire, Sanders & Dempsey, L.L.P.

(57) ABSTRACT

A vehicle appraisal assisting robot (1) includes an information acquisition unit (12) for acquiring basic information required for appraisal of a client vehicle (7), an image taking unit (13) for taking an image of a portion of the vehicle required to evaluate a state of the vehicles, an action generator (17) for generating an action required for the image taking unit to take an image of the portion of the vehicle, a communication unit (15) for sending the basic information and the image information to an apparatus (2) on an appraiser side, which generates appraisal results information based on the information sent from the communication unit. The communication unit also receives the appraisal results information from the apparatus on the appraiser side, and an information output unit (15, 16) outputs the appraisal results information received by the communication unit to present the appraisal results information to the client.

12 Claims, 3 Drawing Sheets

OTHER PUBLICATIONS

Fridman, B., "On-the-Scene Claims," Best's Review, vol. 101, No. 8, p. 92, Dec. 2000.*

Anon., "Roaming Robots," Appliance Manufacturer, vol. 50, No. 11, p. 8, Nov. 2002.*

Merriam-Webster's Collegiate Dictionary, Tenth Edition, 1997, p. 1013.*

Microsoft Press Computer Dictionary, Third Edition, Microsoft Press, Redmond, 1997, pp. 27 and 117.*

* cited by examiner

VEHICLE APPRAISAL ASSISTING ROBOT AND VEHICLE APPRAISAL SYSTEM USING THE ROBOT

TECHNICAL FIELD

The present invention relates to a vehicle appraisal assisting robot for gathering information required for appraisal of a vehicle and providing the information to an appraiser at a remote location to assist the appraisal effort, as well as to a vehicle appraisal system using such a robot.

BACKGROUND OF THE INVENTION

In order for a vehicle owner who is considering selling his/her vehicle to know the purchase price of the vehicle, usually the owner must bring the vehicle in an auto dealer or a used-car dealer, or a vehicle appraiser must go to the vehicle owner's house or the like where the vehicle is located so that the vehicle appraiser can examine the vehicle directly. To eliminate the inconvenience caused by such travel of vehicle or person, it has been proposed to provide a vehicle appraisal system for appraising a vehicle from a remote location by using communication means such as a telephone (see, for example, Japanese Patent Application Laid-Open (kokai) No. 11-184910).

In the above prior art system, however, the information required for vehicle appraisal can be obtained only through conversation with the person or client requesting the appraisal (e.g., the vehicle owner), and therefore, it is difficult to acquire detailed information about the current state of the vehicle, tending to result in an inaccurate purchase price estimation of the vehicle provided from the appraiser. Alternatively, it may be conceived to have the client take images of the vehicle with a camera and appraise the vehicle based on these images. However, the client may lack enough knowledge or skill for taking appropriate images for vehicle appraisal, which can necessitate the client to take images of the vehicle once again, putting undesired burden on the client.

BRIEF SUMMARY OF THE INVENTION

In view of such problems of the prior art, a primary object of the present invention is to provide a vehicle appraisal assisting robot to eliminate the need for the vehicle appraiser to directly examine the vehicle and considerably reduce burden on the client while being capable of easily gathering appropriate information required for accurate vehicle appraisal.

A second object of the present invention is to provide a vehicle appraisal system using such a vehicle appraisal assisting robot.

According to the present invention, such objects can be accomplished by providing a vehicle appraisal assisting robot (1), comprising: information acquisition means (12) for acquiring basic information required for appraisal of a vehicle (7) from a client; an image taking unit (13) for taking an image of a portion of the vehicle required to evaluate a state of the vehicle; an action generator (17) for generating an action required for the image taking unit to take an appropriate image of the portion of the vehicle; a communication unit (15) for sending the information acquired by the information acquisition means and the image information obtained by the image taking unit to an apparatus (2) on an appraiser side, the apparatus on the appraiser side generating appraisal results information based on the information sent from the communication unit, wherein the communication unit also receives the appraisal results information from the apparatus on the appraiser side; and information output means (15, 16) for outputting the appraisal results information received by the communication unit to whereby present the appraisal results information to the client. The basic information of the vehicle acquired by the information acquisition means may comprise a vehicle type, year of manufacture and mileage, for example, and the appraisal results information typically comprises a purchase price of the vehicle.

Such a vehicle appraisal assisting robot can readily achieve gathering appropriate information required for accurate vehicle appraisal without putting a considerable burden on the client (typically, the owner of the vehicle). The robot also eliminates the need for the appraiser to directly examine the vehicle and thus, inconvenience resulting from the travel of the vehicle or a person can be resolved.

The actions generated by the action generator can include, for example, a traveling action for the robot to travel around the vehicle to move to suitable positions for taking images of desired portions of the vehicle and/or an imaging angle adjustment action for actuating the robot's head or the like where the image taking unit is incorporated to make the image taking unit properly face the portions of the vehicle. It is also possible that the robot gets in the vehicle to take images of inside portions of the vehicle, whereby allowing the interior of the vehicle to be examined. The particular conditions of image taking such as the portions (locations) of the vehicle where images should be taken, image taking angles, etc. can be specified by the instructions from the client or by a prescribed program installed in the vehicle appraisal assisting robot so that the robot can autonomously locate the vehicle portions to be examined.

The information acquisition means can preferably comprise a microphone for receiving verbal messages from the client and a voice recognition unit for converting the received audio data into text data so that the information acquisition means can acquire necessary information regarding the vehicle through oral communication with the client. In addition or alternatively, the information acquisition means may comprise an input device such as a touch panel display or keypad for allowing the client to enter information of the vehicle. In such a case, the input device may be mounted on the robot or may be incorporated in a personal computer in which the information entered in the personal computer is sent to the robot by wireless transmission, for example.

The vehicle appraisal assisting robot can be preferably embodied by a domestic robot furnished with an application program and having a controller (11) for executing the application program to control the information acquisition means, image taking unit, action generator, communication unit and information output means. This can make it possible to acquire information necessary for vehicle appraisal by utilizing the domestic robot used at the client's home, whereby eliminating the inconvenience that could result from the travel or transport of vehicle and making the vehicle appraisal service more readily available to the client. The domestic robot may be the one used at a gas station or other facilities providing services to many vehicle users.

In the vehicle appraisal assisting robot, the controller can be adapted to receive commands from the apparatus on the appraiser side via the communication unit and execute them so that the robot can be remote controlled by the apparatus on the appraiser side. This allows the vehicle appraiser to efficiently gather enough information necessary for accurate vehicle appraisal.

The remote control of the robot from the appraiser side may be preferably conducted supplementarily when necessity arises, such as when some of the images sent from the robot to the apparatus on the appraiser side are missing or unclear. In such cases, the robot can move to suitable positions under remote control by the appraiser side to take images of the vehicle for supplementing the missing images. It is also possible to carry out whole part of the image taking under remote control from the appraiser side without relying upon the autonomous ability of the robot. Further, in order to prevent unauthorized party to remote control the robot, a prescribed verification process can be conducted so that only an authentic apparatus on the appraiser side is allowed to remote control the robot. Besides, if there is any missing data found in the basic information sent from the robot, it is possible to remote control the information acquisition means and information output means of the robot so that the robot can communicate with the client to acquire the missing data from the client.

The information output means may preferably comprise an audio output unit (16) for outputting an audio message representing the appraisal results information in a prescribed language. This allows the appraisal results information such as a purchase price to be quickly presented to the client in an easily understandable fashion. Such an audio output unit can preferably configured by a loud speaker for emitting sound and a voice synthesis unit for converting the text-form appraisal results information into audio data. Further, when the robot takes images of portions of the vehicle, the audio output unit may provide verbal instructions for prompting the client to take necessary actions such as opening a certain door or hood of the vehicle, for example.

Also, the information output means of the robot of the present invention may comprise a communication unit (15) for sending the appraisal results information to an information terminal device of the client. In such a case, the appraisal results information can be sent to the information terminal device of the client via e-mail. The client's device can store the appraisal results information received from the robot, thus eliminating the inconvenience on the client side to write down the appraisal results information.

According to another aspect of the present invention, there is provided a vehicle appraisal system, comprising: a vehicle appraisal assisting robot (1) for gathering information required for appraising a vehicle (7); and an apparatus (2) on an appraiser side having an appraisal database, wherein the apparatus on the appraiser side receives the information gathered by the robot and accesses the appraisal database by using the information received from the robot to whereby generate appraisal results information, the appraisal results information being sent to the robot, wherein the robot comprises: information acquisition means (12) for acquiring basic information required for appraisal of the vehicle from a client; an image taking unit (13) for taking an image of a portion of the vehicle required to evaluate a state of the vehicle; an action generator (17) for generating an action required for the image taking unit to take an appropriate image of the portion of the vehicle; a communication unit (15) for sending the information acquired by the information acquisition means and the image information obtained by the image taking unit to the apparatus on the appraiser side as the information gathered by the robot, the apparatus on the appraiser side generating the appraisal results information based on the information sent from the communication unit, wherein the communication unit also receives the appraisal results information from the apparatus on the appraiser side; and information output means (15, 16) for outputting the appraisal results information received by the communication unit to whereby present the appraisal results information to the client.

Such a system can considerably facilitate gathering appropriate information required for accurate vehicle appraisal without putting a considerable burden on the client. Further, the system can eliminate the need for the appraiser to directly examine the vehicle and thus, inconvenience resulting from the travel of the vehicle or a person of a vehicle appraisal company can be resolved.

Preferably, the apparatus on the appraiser side also receives results of evaluation by an appraiser on the vehicle, and reflects the evaluation results by the appraiser on the appraisal results information. This can provide even more accurate vehicle appraisal.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
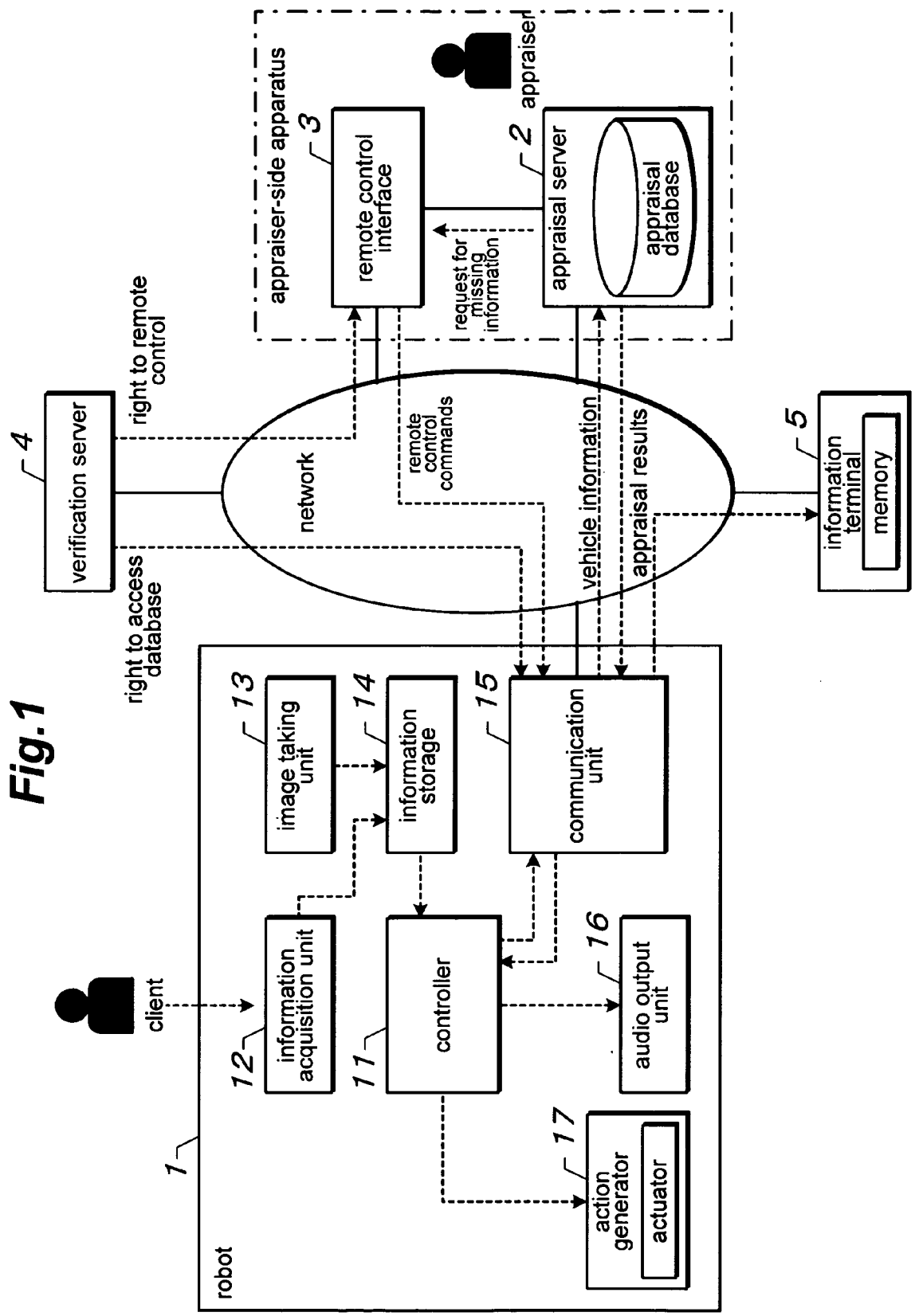
FIG. 1 is a block diagram for schematically showing a vehicle appraisal system using a vehicle appraisal assisting robot according to the present invention.

FIG. 1 is a block diagram schematically showing a vehicle appraisal system using a vehicle appraisal assisting robot according to the present invention. This vehicle appraisal system comprises a robot 1 for gathering information required for vehicle appraisal, an appraisal server (apparatus on the appraiser side) 2 for appraising the vehicle based upon the information gathered by the robot 1 and sending the appraisal results information to the robot 1, a remote control interface 3 for allowing an operator on the appraiser-side to remote control the robot 1, and a verification server 4 for preventing unauthorized access to the robot 1 and the appraisal server 2.

The robot 1 can be embodied by a domestic robot that may be used at home. A client requesting appraisal of a vehicle (typically, an owner of the vehicle) can finish the domestic robot with an appropriate application program for making the robot carry out appropriate operations for gathering information required for the vehicle appraisal. Preferably, the application program to be introduced into the robot 1 can be downloaded from an appropriate server when the request for vehicle appraisal from the client is accepted.

The robot 1 comprises an information acquisition unit (information acquisition means) 12 for acquiring basic information regarding the vehicle, i.e., vehicle type (vehicle model), year of manufacture, mileage, presence/absence of optional parts, and the like.

The information acquisition unit 12 can have various configurations but preferably is adapted to acquire information from verbal communication with the client. Specifically, the information acquisition unit 12 may comprise a microphone to receive the verbal messages from the client, and performs voice recognition process thereon to convert the input audio data into text data from which the information is retrieved. In addition or alternatively, the robot 1 may have a touch panel display or keypad mounted on its body to allow the client to input the information therewith. It may be also conceivable to prepare a personal computer installed with an application program for guiding the client to enter appropriate information and transmits the input data from the personal computer to the information acquisition unit 12 of the robot 1 via a suitable communication medium such as a wireless LAN or the like.

The robot 1 comprises an image taking unit 13 for taking images of desired portions of the vehicle and an action generator (action generating means) 17 for generating necessary actions for allowing the imaging taking unit 13 to take appropriate images. The image data obtained by the image taking unit 13 are to be used in evaluating the state of the vehicle (e.g., presence/absence of any damage such as scratches, dents or the like and the extent thereof), and stored in an information storage 14 together with the basic information acquired by the information acquisition unit 12.

The action generator 17 comprises an actuator or actuators for actuating the head, legs, arms, etc. of the robot 1 based upon control information produced in accordance with commands from a controller 11. The actions that may be generated by the action generator 17 can include a traveling action for the robot 1 to travel around the vehicle to move to suitable positions for taking images of desired portions of the vehicle and/or an imaging angle adjustment action for actuating the robot's head or the like where the image taking unit 13 is incorporated, to make the image taking unit 13 properly face the portions of the vehicle. It should be noted that although it may be desirable for the robot 1 to have a human-like figure in order to facilitate taking images of various portions of the vehicle, the robot 1 may not be limited to a humanoid robot. For example, the robot 1 may have a traveling mechanism comprising wheels or endless belts instead of the bi-pedal walking mechanism.

In addition to acquisition of image data of various portions of the vehicle to be examined, the image taking unit 13 may continuously operate so that the continuously acquired images can be properly processed by the robot 1 to obtain information on the circumstances around it. The image taking unit 13 preferably comprises a stereo camera having a pair of color CCDs (left and right), for example. Based on the parallax between the left and right images, the robot 1 can recognize the surrounding environment three-dimensionally, and in accordance with the acquired information, produces the control information for the actuators of the action generator 12 to generate desired actions autonomously.

When taking images of the vehicle to be examined, the robot 1 can process the image information from the image taking unit 13 to detect the vehicle and locate portions of the vehicle where images should be taken, and autonomously make appropriate actions inclusive of moving to positions suitable for taking images of the vehicle portions. In this case, the portion or portions of the vehicle where images should be taken may be specified by, for instance, instructions from a service person or operator of a vehicle appraisal company or alternatively by a prescribed program.

It may be also possible that the client guides the robot 1 to the positions suitable for taking images of desired vehicle portions by giving the robot 1 proper commands, such as "move forward," "turn right," etc., while watching the move of the robot 1. In such a case, the robot 1 preferably has a microphone for receiving vocal instructions from the client and performs voice recognition process thereon to convert the input audio data into text data to thereby identify the given instructions.

The robot 1 comprises a communication unit (communication means) 15 for sending the basic information obtained by the information acquisition unit 12 and the image data obtained by the image taking unit 13 to the appraisal server (or apparatus on the appraiser side) 2 as well as for receiving appraisal results information from the appraisal server 2, where the appraisal results information can be obtained by accessing an appraisal database in the appraisal server 2 by using the information sent from the robot 1, as described more in detail later. The appraisal server 2 may consist of a Web server that can be accessed via Internet, while the robot 1 may be connected to an access point to the Internet via wireless local area network (LAN).

The robot 1 has an audio output unit (information output means) 16 for providing the client with the appraisal results information received by the communication unit 15 as vocal messages in a prescribed language. The audio output unit 16 performs voice synthesis to convert the output information consisting of text data into audio data which are output through a loud speaker as a vocal sound representing the appraisal results such as a purchase price.

When the information acquisition unit 12 gathers basic information required for vehicle appraisal from the client, the audio output unit 16 can be preferably used to help the client give the required information to the robot 1 in an interactive fashion where the audio output unit 16 provides prescribed questions in a desired language and the client answers the questions in voice or by operating an input device such as a keypad equipped to the robot 1.

The appraisal results information can be also presented to the client by transmitting (preferably wireless) the appraisal results information to an information terminal device 5 of the client via the communication unit 15. The information terminal device 5 can store the received appraisal results information in its memory so that the client can access the information at any desired time. In the shown embodiment, the appraisal results information can be sent to the client's information terminal device 5 (e.g., personal computer or portable phone) via an appropriate communication network such as the Internet as e-mail, for example.

The controller 11 of the robot 1 can receive commands for controlling the information acquisition unit 12, image taking unit 13, audio output unit 16 and action generator 17 from the remote control interface 3, and execute them. This can allow an appraiser-side operator to remote control the action generator 17 and image taking unit 13 to take appropriate images of desired portions of the vehicle as well as to remote control the information acquisition unit 12 and audio output unit 16 to acquire basic information required for vehicle appraisal through an interaction with the client.

In the appraisal server 2, the purchase price of the vehicle can be computed by accessing the appraisal database using the information sent from the robot 1. Preferably, the appraiser may evaluate the information such as image data of the vehicle and reflect the evaluation results on the purchase price, if necessary. In a preferred embodiment, each item of the basic information such as the vehicle type, manufacture year and mileage is assigned with certain points by referring a prescribed database or table, and the images of the vehicle are examined by the appraiser and assigned with certain points depending on the state of vehicle (or extent of damage) so that the points assigned to the items of information and vehicle images are comprehensively taken into consideration to determine the purchase price.

After the information gathered by the robot 1 is transmitted to the server 2, the information is checked by the server 2 and/or the appraiser to determine if there are any missing or unclear images for some portions of the vehicle required for vehicle appraisal, and if any, a request for the missing information is sent to the remote control interface 3, which can be operated by an operator on the appraiser side. Upon reception of the request for the missing information, the remote control interface 3 sends appropriate commands or signals to the robot 1 to remote control the same.

The verification server 4 works to prevent unauthorized access to the appraiser server database of the appraisal server 2. When a request for vehicle appraisal is sent from the robot 1 to the appraisal server 2, the verification server 4 carries out a prescribed procedure inclusive of verification of the password and issuance of certificate, and provides the robot 1 with a right to access the appraisal database when the robot 1 is found authentic. The verification server 4 also functions to prevent unauthorized remote control of the robot 1. Specifically, when a request is sent from the remote control interface 3 to the robot 1, the verification server carries out a prescribed verification procedure and provides the remote control interface 3 with a right to control the robot 1 only when the remote control interface 3 is found authentic.

The remote control interface 3 comprises an operation unit used by the operator, a display for showing information such as the images taken by the image taking unit 13 of the robot 1, and a communication unit for allowing communication with the robot 1. In the case that the robot 1 can autonomously make necessary actions such as traveling to an appropriate position to take a specified portion(s) of the vehicle, the remote control interface 3 is only required to send commands for specifying the vehicle portion(s). In another case where it is necessary to guide the robot 1 to a position suitable for image acquisition by giving it concrete instructions such as "move forward" or the like, the operating unit of the remote control interface 3 may preferably have a joystick, for example, so that the operator can control the robot 1 by operating the joystick while watching the images taken by the image taking unit 13 and displayed on a monitor of the interface 3.

Figure 2:
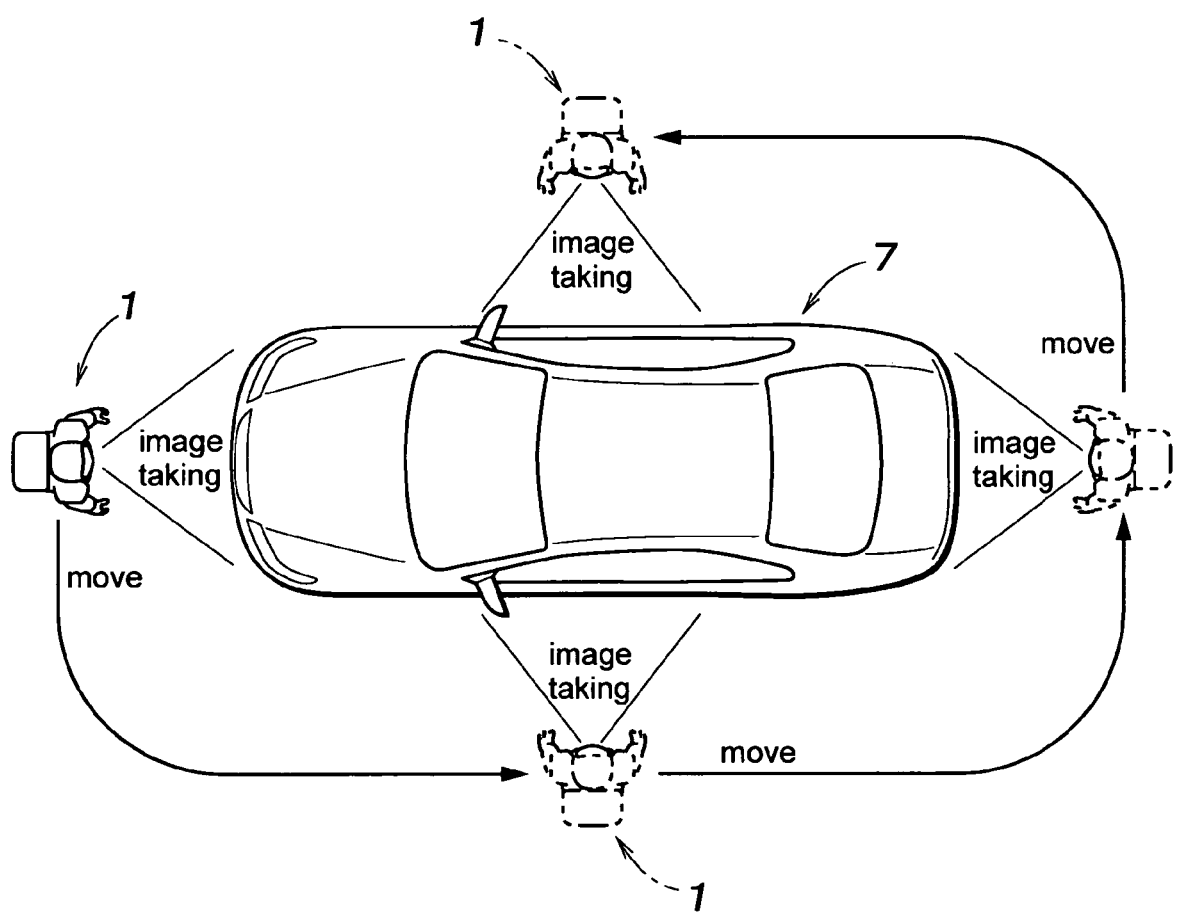
FIG. 2 is a top plan view for showing the robot of FIG. 1 taking images of the vehicle to be examined.

FIG. 2 is a top plan view showing the robot 1 of FIG. 1 taking images of a vehicle 7. In accordance with the determination of the portions of the vehicle 7 where images should be taken or following the direction from the client or the remote control interface 3, the robot 1 autonomously or manually moves around the vehicle 7 to be appraised and takes images of external views of the vehicle 7 such as front, side and rear views. In this way, image information for evaluating the state of exterior of the vehicle 7 can be obtained. In the case that the robot 1 assumes a human-like figure, it is also possible that the robot 1 gets in the vehicle 7 to take images of inside portions thereof, whereby allowing the interior of the vehicle 7 to be examined.

Figure 3:
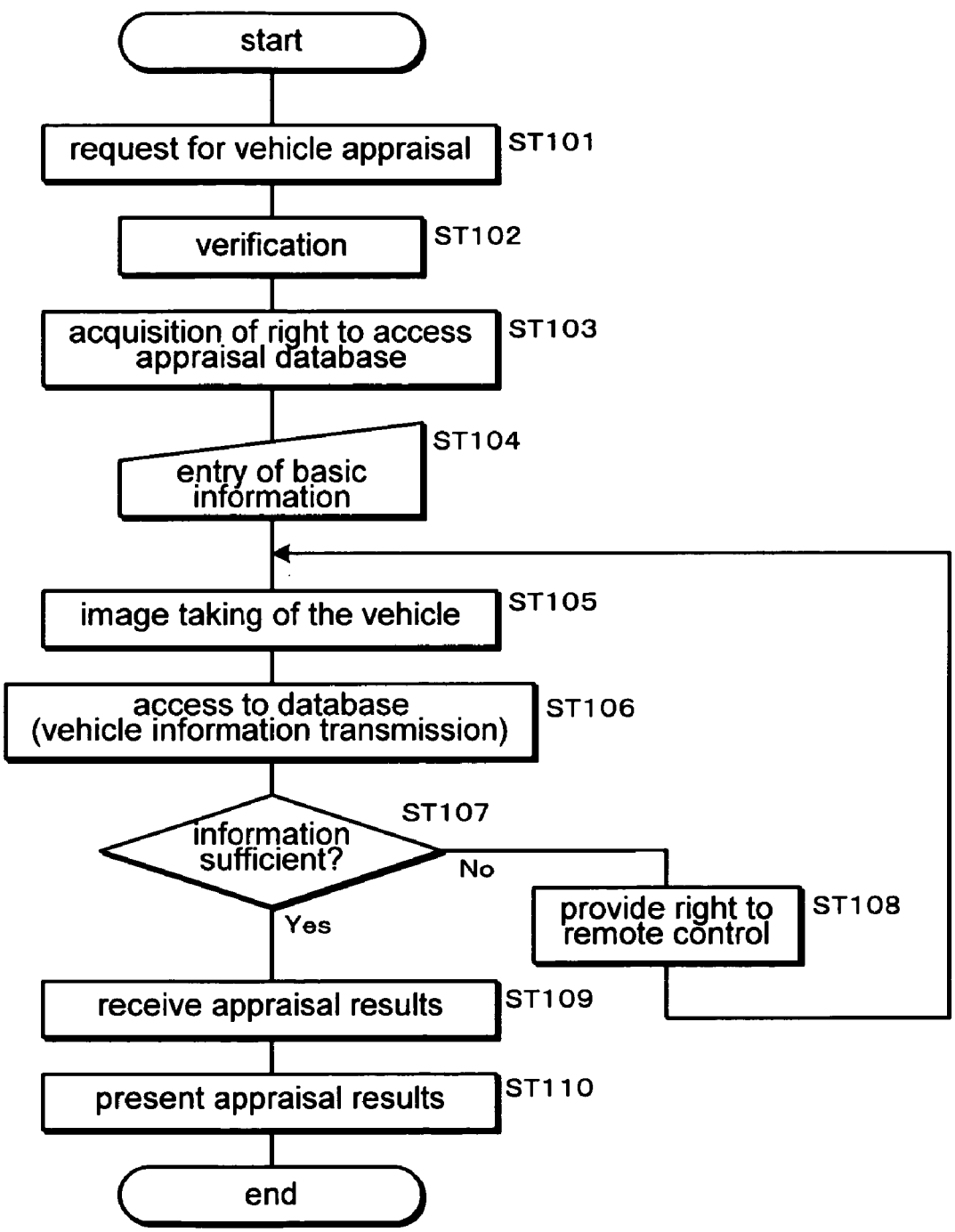
FIG. 3 is a flowchart showing a process performed by the vehicle appraisal system of FIG. 1.

FIG. 3 is a flowchart showing a process carried out by the vehicle appraisal system of FIG. 1. First, when the client (a person selling the vehicle) instructs the robot 1 to appraise his/her vehicle, the robot 1 sends a request for appraisal to the appraisal server 2 (step 101). Then, after the verification server 4 has verified the authenticity of the robot 1 in accordance with a prescribed verification procedure (step 102), a right to access the appraisal database of the appraisal server 2 is given to the robot 1 (step 103).

The robot 1 gathers basic information (e.g., vehicle type) for vehicle appraisal through verbal communication with the client or by the client's operation of keypad on the robot 1 (step 104), and takes images of portions of the vehicle needed for vehicle appraisal (step 105). Subsequently, the robot 1 accesses the appraisal server 2 to send the acquired basic information and images to the server 2 (step 106).

The appraisal server 2 determines whether or not the information received is sufficient for vehicle appraisal (step 107), and if not, a request for missing information is sent from the appraisal server 2 to the remote control interface 3. After the verification server 4 has carried out the verification process to give the remote control interface 3 a right to remote control the robot 1 (step 108), the robot 1 takes images of desired portions of the vehicle under the remote control by the remote control interface 3 (step 105).

If the appraisal server 2 finds that the information from the robot 1 is sufficient, the appraisal database is referred to by using the information from the robot 1 to generate appraisal results information inclusive of a purchase price of the vehicle, and the appraisal results information is sent to the robot 1 (step 109). In the robot 1, the audio output unit 16 produces sound messages representing or explaining the received appraisal results information (step 110).

It should be noted that in the above embodiment, the remote control interface 3 controlled the robot 1 to supplement the missing images of portions of the vehicle, but in addition, in the case that there is a deficiency in the basic information such as the vehicle type (due to inadvertent data entry failure or errors, for example), the remote control may be used to allow the robot 1 to verbally interact with the client to acquire the missing information.

As described above, the vehicle appraisal assisting robot and the vehicle appraisal system using such a robot according to the present invention can considerably facilitate acquiring enough information required for accurate vehicle appraisal without causing inconvenience to the client and at the same time can reduce or eliminate the burden on the appraiser to directly inspect the vehicle. Therefore, the present invention is quite useful in achieving an efficient and easy-to-use vehicle appraisal system.

Although the present invention has been described in terms of a preferred embodiment thereof, it is obvious to a person skilled in the art that various alterations and modifications are possible without departing from the scope of the present invention which is set forth in the appended claims.

The invention claimed is:

1. A vehicle appraisal assisting robot, comprising:
an information acquisition unit for acquiring basic information required for appraisal of a vehicle from a client;
an image taking unit for taking an image of a portion of the vehicle required to evaluate a state of the vehicle;
an action generator for generating an action required for the image taking unit to take an appropriate image of the portion of the vehicle;
a communication unit for sending the information acquired by the information acquisition unit and the image information obtained by the image taking unit to an apparatus on an appraiser side, the apparatus on the appraiser side generating appraisal results information based on the information sent from the communication unit, wherein the communication unit also receives the appraisal results information from the apparatus on the appraiser side;
an information output unit for outputting the appraisal results information received by the communication unit to present the appraisal results information to the client;
a controller for executing an application program to control the information acquisition unit, image taking unit, action generator, communication unit and information output unit; and
a mobile robot comprising the information acquisition unit, the image taking unit, the action generator, the communication unit, the information output unit, and the controller,
wherein the apparatus on the appraiser side is configured to determine whether the information gathered by the mobile robot is adequate for appraisal so that the apparatus may generate an appraisal result when the information gathered by the mobile robot is adequate for appraisal, and to remote control the mobile robot to acquire any missing information when the information gathered by the mobile robot is not adequate for appraisal.

2. The vehicle appraisal assisting robot according to claim 1, wherein the robot consists of a domestic robot used at the client's home.

3. The vehicle appraisal assisting robot according to claim 2, wherein the controller is adapted to receive commands from the apparatus on the appraiser side via the communication unit and execute them so that the robot can be remote controlled by the apparatus on the appraiser side.

4. The vehicle appraisal assisting robot according to claim 1, wherein the information output unit comprises an audio output unit for outputting an audio message representing the appraisal results information in a prescribed language.

5. The vehicle appraisal assisting robot according to claim 1, wherein the information output unit comprises a communication unit for sending the appraisal results information to an information terminal device of the client.

6. The vehicle appraisal assisting robot according to claim 1, wherein the basic information of the vehicle acquired by the information acquisition unit comprises a vehicle type, year of manufacture, and mileage.

7. The vehicle appraisal assisting robot according to claim 1, wherein the appraisal results information comprises a purchase price of the vehicle.

8. A vehicle appraisal system, comprising:
a vehicle appraisal assisting mobile robot for gathering information required for appraising a vehicle; and
an apparatus on an appraiser side having an appraisal database, wherein the apparatus on the appraiser side receives the information gathered by the robot and accesses the appraisal database by using the information received from the robot to generate appraisal results information, the appraisal results information being sent to the robot, wherein the mobile robot comprises
an information acquisition unit for acquiring basic information required for appraisal of the vehicle from a client,
an image taking unit for taking an image of a portion of the vehicle required to evaluate a state of the vehicle,
an action generator for generating an action required for the image taking unit to take an appropriate image of the portion of the vehicle,
a communication unit for sending the information acquired by the information acquisition unit and the image information obtained by the image taking unit to the apparatus on the appraiser side as the information gathered by the robot, the apparatus on the appraiser side generating the appraisal results information based on the information sent from the communication unit, wherein the communication unit also receives the appraisal results information from the apparatus on the appraiser side,
an information output unit for outputting the appraisal results information received by the communication unit to present the appraisal results information to the client, and
a controller for executing an application program to control the information acquisition unit, image taking unit, action generator, communication unit and information output unit, and wherein the apparatus on the appraiser side is configured to determine whether the information gathered by the mobile robot is adequate for appraisal so that the apparatus may generate an appraisal result when the information gathered by the mobile robot is adequate for appraisal, and to remote control the mobile robot to acquire any missing information when the information gathered by the mobile robot is not adequate for appraisal.

9. The vehicle appraisal system according to claim 8, wherein the apparatus on the appraiser side also receives results of evaluation by an appraiser on the vehicle, and reflects the evaluation results by the appraiser on the appraisal results information.

10. The vehicle appraisal system according to claim 8, wherein the robot consists of a domestic robot.

11. A vehicle appraisal assisting robot, comprising:
an information acquisition means for acquiring basic information required for appraisal of a vehicle from a client;
an image taking means for taking an image of a portion of the vehicle required to evaluate a state of the vehicle;
an action generating means for generating an action required for the image taking means to take an appropriate image of the portion of the vehicle;
a communication means for sending the information acquired by the information acquisition unit and the image information obtained by the image taking unit to an apparatus on an appraiser side, the apparatus on the appraiser side generating appraisal results information based on the information sent from the communication unit, wherein the communication means also receives the appraisal results information from the apparatus on the appraiser side;
an information outputting means for outputting the appraisal results information received by the communication means to present the appraisal results information to the client;
a controlling means for executing an application program for controlling the information acquisition means, image taking means, action generator means, communication means and information output means; and
a mobile robot comprising the information acquisition means, the image taking means, the action generating means, the communication means, the information outputting means, and the controlling means,
wherein the apparatus on the appraiser side is configured to determine whether the information gathered by the mobile robot is adequate for appraisal so that the apparatus may generate an appraisal result when the information gathered by the mobile robot is adequate for appraisal, and to remote control the mobile robot to acquire any missing information when the information gathered by the mobile robot is not adequate for appraisal.

12. A vehicle appraisal system, comprising:
a vehicle appraising assisting mobile robot for gathering information required for appraising a vehicle; and
an apparatus on an appraiser side having an appraisal database, wherein the apparatus on the appraiser side receives the information gathered by the robot and accesses the appraisal database by using the information received from the robot to generate appraisal results information, the appraisal results information being sent to the robot, wherein the mobile robot comprises an information acquisition means for acquiring basic information required for appraisal of the vehicle from a client, an image taking means for taking an image of a portion of the vehicle required to evaluate a state of the vehicle, an action generating means for generating an action required for the image taking means to take an appropriate image of the portion of the vehicle, a communicating means for sending the information acquired by the information acquisition means and the image information obtained by the image taking means to an apparatus on the appraiser side as information gathered by the robot, the apparatus on the appraiser side generating the appraisal results information based on the information sent from the communicating means, wherein the communication means also receives the appraisal results information from the apparatus on the appraiser side, an information output means for outputting the appraisal results information received by the communicating means to present the appraisal results information to the client, and a controlling means for executing an application program for controlling the information acquisition means, image taking means, action generator means, communication means and information output means, and wherein the apparatus on the appraiser side is configured to determine whether the information gathered by the mobile robot is adequate for appraisal so that the apparatus may generate an appraisal result when the information gathered by the mobile robot is adequate for appraisal, and to remote control the mobile robot to acquire any missing information when the information gathered by the mobile robot is not adequate for appraisal.

* * * * *